(12) United States Patent
Faucett

(10) Patent No.: US 6,765,848 B2
(45) Date of Patent: Jul. 20, 2004

(54) FOCUS AND TRACKING REPEATABLE RUNOUT COMPENSATOR

(75) Inventor: Michael D. Faucett, Ft. Collins, CO (US)

(73) Assignee: Infineon Technologies North America Corp., San Jose, CA (US)

(*) Notice: Subject to any disclaimer, the term of this patent is extended or adjusted under 35 U.S.C. 154(b) by 291 days.

(21) Appl. No.: 09/758,405

(22) Filed: Jan. 10, 2001

(65) Prior Publication Data

US 2002/0089906 A1 Jul. 11, 2002

(51) Int. Cl.$^7$ .............................................. G11B 7/095
(52) U.S. Cl. ........................ 369/44.32; 369/44.34; 369/44.36; 369/53.13
(58) Field of Search .................... 369/44.32, 44.28, 369/47.39, 47.31, 44.29, 53.14, 53.25, 44.35, 44.27, 30.17, 30.27, 44.25, 44.34; 360/75, 51, 77.04

(56) References Cited

U.S. PATENT DOCUMENTS

| | | | | |
|---|---|---|---|---|
| 4,745,587 A | * | 5/1988 | Maeda et al. | 369/30.27 |
| 5,479,389 A | * | 12/1995 | Ann | 369/47.39 |
| 5,559,768 A | * | 9/1996 | Ito et al. | 369/44.25 |
| 5,761,165 A | * | 6/1998 | Takeda et al. | 360/51 |
| 5,901,121 A | * | 5/1999 | Yamashita et al. | 369/44.28 |
| 5,926,338 A | * | 7/1999 | Jeon et al. | 360/77.04 |
| 6,137,753 A | * | 10/2000 | Grimsley | 369/44.32 |
| 6,147,944 A | * | 11/2000 | Kwon et al. | 369/44.32 |
| 6,266,304 B1 | * | 7/2001 | Nagano et al. | 369/44.32 |

* cited by examiner

Primary Examiner—William Korzuch
Assistant Examiner—Kim-Kivok Chu
(74) Attorney, Agent, or Firm—Fish & Richardson P.C.

(57) ABSTRACT

A repeatable runout compensator that allows a transducer of a servo system in a storage device employing rotating media to follow the eccentricity on the media is disclosed. In exemplary embodiments, the repeatable runout compensator utilizes error values generated by the servo system, which represent the radial and/or axial eccentricity of the media, to generate an output signal having a sinusoidal waveform that is approximately 180 degrees out of phase with the eccentricities and the harmonics of eccentricities on the media.

30 Claims, 2 Drawing Sheets

FOCUS AND TRACKING REPEATABLE RUNOUT COMPENSATOR

BACKGROUND OF THE INVENTION

1. Field of the Invention

The present invention relates generally to storage devices employing rotating media, particularly optical disc media or the like, and more specifically to a focus and tracking repeatable runout compensator that allows the transducer of an servo system in a storage device employing rotating media to follow the eccentricity on the media.

2. Description of the Related Art

Rotating media, especially removable optical disc media such as compact disc (CD) media, compact disc read only memory (CD-ROM) media, digital video disc (DVD) media, or the like, typically have some inherent eccentricity due to manufacturing variances or later damage during use. This eccentricity must be followed by the transducer of storage devices using the media in order to correctly read data from and/or write data to the media. In particular, eccentricity can exist on removable optical disc media that is of such a magnitude that conventional control methods can not follow the eccentricity, causing errors in data read from or written to the media. Similarly, the harmonics of the eccentricity in such media may be too large to be compensated for using conventional control methods. Further, the eccentricity may vary with time or change in frequency depending on whether the storage device is using a continuous angular velocity (CAV) operating mode, wherein the rotational frequency of the media is fixed, or a continuous linear velocity (CLV) operating mode, wherein the rotational frequency changes as the optical transducer moves across the media.

In the past, attempts have been made to compensate for eccentricities in optical disc media utilizing techniques such as discrete Fourier transform algorithms, least mean square algorithms, or estimator based runout compensators. Discrete Fourier transform algorithms learn the media eccentricity and then calculate the magnitude and phase of the eccentricity. A feed-forward correction is then applied corresponding to the learned eccentricity. Least mean square algorithms adjust two weighting factors to find the contribution of sine and cosine functions to be used in correcting for media eccentricity. Estimator based runout compensators converge to the media eccentricity by reducing the position error of an estimator. However, such techniques are not time-variant, and, as a result, require calibration and re-calibration routines. Further, these techniques display greater sensitivity to noise in the focus or tracking signal, require greater computation time, and utilize additional code space for sine and cosine lookup tables.

Consequently, it is desirable to provide a compensator that allows the transducer of a storage device employing rotating media to follow the radial (tracking) and axial (focus) eccentricity on the media. Preferably, the compensator would be time-variant, would not need calibration and re-calibration routines, and would require minimal computation time and code space.

SUMMARY OF THE INVENTION

Accordingly, the present invention is directed to a repeatable runout compensator that allows the transducer of a servo system in a storage device employing rotating media to follow the radial and/or axial eccentricity on the media. In exemplary embodiments, the repeatable runout compensator generates a sine wave output signal that is approximately 180 degrees (or an odd whole multiple of 180 degrees) out of phase with the eccentricity on the media utilizing previous values of the output signal and error values generated by the servo system representing the radial and/or axial eccentricity of the media. The output signal may then be used by the servo system for controlling operation of the transducer to at least partially compensate for the eccentricity in the media. The repeatable runout compensator accommodates time variant runout, requires less computation time and code space than prior art eccentricity compensation techniques and does not utilize extensive sine and cosine lookup tables. Further, the repeatable runout compensator may be easily adaptable to different eccentric frequencies, and, in embodiments of the invention, may be extendable to include correction for eccentric harmonic frequencies.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
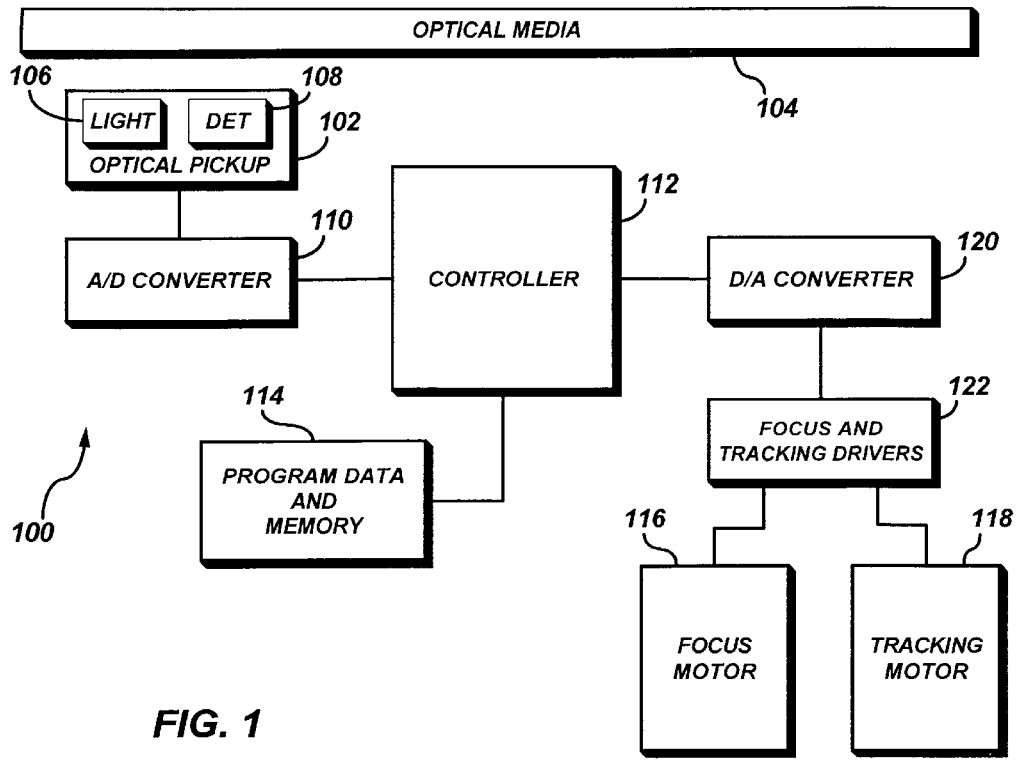
FIG. 1 is a block diagram illustrating an exemplary servo system of a storage device employing rotating media.

Referring now to FIG. 1, an optical servo system employing a repeatable runout compensator in accordance with an exemplary embodiment of the present invention is described. The optical servo system 100 is used to position an optical pickup or transducer 102 onto a track on a rotating optical disc media 104. As shown in FIG. 1, the optical pickup 102 includes a light source 106 such as a laser diode or the like for producing coherent light that is reflected off of the media 104. The reflected light is detected by an optical detector assembly 108 within the optical pickup mechanism 102. In embodiments of the invention, the optical detector assembly 108 may include multiple opto-electronic light detectors capable of measuring changes in the reflectivity of the media 104 and producing an analog signal in response thereto. For instance, in one embodiment, the optical detector assembly 108 may be a quad-detector having four light detectors each capable of measuring light reflected from the media 104. The analog signal from the optical detector assembly 108 is converted to a digital signal by A/D (analog to digital) converter(s) 110 and provided to controller 112. In exemplary embodiments, controller 112 may comprise a processing unit such as a microprocessor or microcontroller for executing programs, performing data manipulations and controlling the tasks of the optical servo system 100. Controller 112 may further be coupled to a memory or storage device 114 for storing program data or like information utilized by the controller 112. Controller 112 manipulates the digital signal received from the A/D converters 110 to obtain error values (E(n)) which describe the eccentricity on the media 104. These error values (E(n)) are then used by the controller 112 for generating an eccentricity compensation value that is used to control focus and tracking motors 116 & 118 for positioning the optical pickup mechanism relative to the media 104 so that the focus and tracking errors are minimized, or eliminated. In one embodiment, the eccentricity compensation value is output as a digital signal that is converted to an analog signal by D/A (digital to analog) converter(s) 120 and applied to the focus and tracking motor drivers 122, which control operation of the focus and tracking motors 116 & 118.

Figure 2:
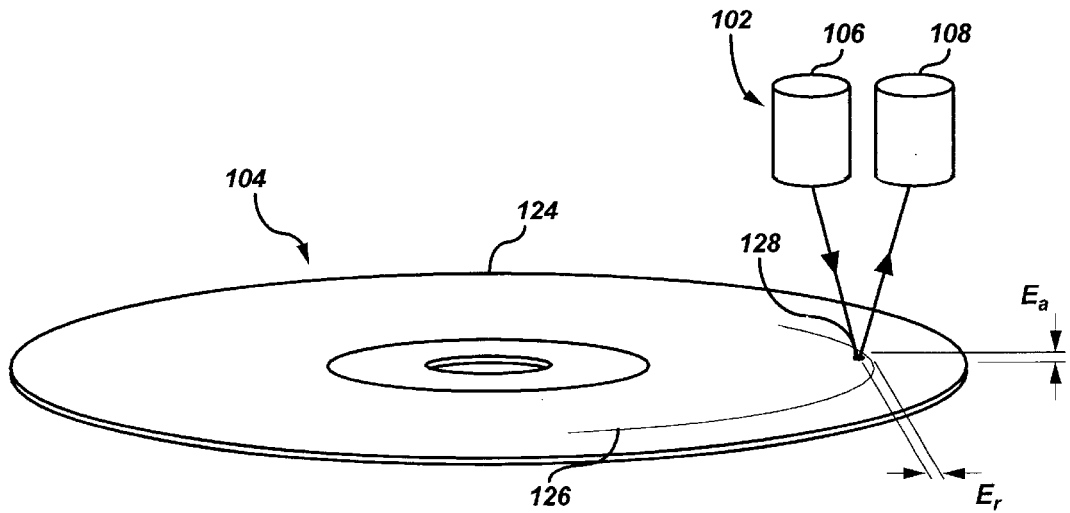
FIG. 2 is an isometric view depicting an exemplary rotating media illustrating radial (tracking) and axial (focus) eccentricity on the media.

FIG. 2 illustrates an exemplary rotating media having radial (tracking) and axial (focus) eccentricity. It will be appreciated that the degree of eccentricity on the media 104 is exaggerated in FIG. 2 for purposes of clarity of illustration. In exemplary embodiments, the rotating media 104 is comprised of an optical disc 124 on which data is encoded or recorded as a plurality of pits or bumps arranged in a single, continuous spiral track 126. Light from the light source 106 is directed onto the optical disc 124 within the track 126 and reflected to the optical detector assembly 108. Where no eccentricity exists on the media 104, the location of the point 128 where light from the light source 106 is focused follows track 126 as the disc 124 rotates, allowing data to be correctly read from or written to the media 104. However, when eccentricity exists on the media 104, the location of this point 128 may at least partially deviate from the track 126 as the disc 124 rotates unless suitable compensation for the eccentricity is provided. For instance, the location of point 128 may deviate from the track 126 toward the inner diameter or outer diameter of the optical disc 124 due to the irregularity in the track 126 caused by radial eccentricity in the optical disc 124. This deviation or error is shown as distance $E_r$ in FIG. 2. Further, the media 104 may move away from or towards the optical pickup 102 due to axial eccentricity of the disc 124. This deviation or error is illustrated as distance $E_a$ in FIG. 2.

Because media 104 is rotating, errors $E_r$ and $E_a$ caused by radial and axial eccentricity in the optical disc 124 will approximate a sine wave if plotted versus time. The present invention provides a repeatable runout compensator that allows the optical pickup 102 of optical servo system 100 to follow the axial and/or radial eccentricities present in the media 104 by generating an eccentricity compensation signal having a sinusoidal waveform that is approximately 180 degrees (or an odd whole multiple of 180 degrees, e.g., 180 degrees, 540 degrees, 900 degrees, 1260 degrees, etc.) out of phase with the eccentricities. This signal is then output to the focus and tracking drivers 122 for controlling operation of the focus and tracking motors 116 & 118 which reposition the optical pickup 102, or optionally the media 104, to compensate for the eccentricity. In this manner, the errors in data read from or written to the media 104 due to eccentricity in the media may be reduced or substantially eliminated.

In accordance with an exemplary embodiment of the present invention, controller 112 may generate a sinusoidal signal using the following equation:

$$Y(n)=(2\cdot\cos(Hz\cdot 2\pi\cdot T_{samp}))\cdot Y(n-1)-Y(n-2), n=0, 1, 2, \ldots \quad \text{Eqn. 1}$$

where Y(n) is the digital output signal from the controller 112, Hz is the rotational frequency of the media 104, $T_{samp}$ is the sample time of the servo system 100, Y(n−1) is the previous value of Y(n), and Y(n−2) is the previous value of Y(n−1).

From Equation 1, it can be seen that output signal Y(n) will equal zero if the previous values of the signal Y(n−1) and Y(n−2) are zero. However, if Y(n−1) and Y(n−1) are seeded with a value A, then a cosine wave will be generated with amplitude A and frequency Hz. If eccentricity is present in the optical disc 124, controller 112 may further generate a sine wave based on the obtained error values describing the eccentricity utilizing the following equation:

$$Y(n)=A\cdot E(n)+B\cdot E(n-1), n=0, 1, 2, \ldots \quad \text{Eqn. 2}$$

where Y(n) is the digital output signal from the controller 112, E(n) is the current error signal from optical pickup 102 after being converted to a digital signal by A/D converter 110, E(n−1) is the previous error signal from the optical pickup 102 after being converted to a digital signal by A/D converter 110, A is constant less than zero (A<0), and B is a constant greater than the absolute value of A (B>|A|). By making A less than zero and B positive and greater than the absolute value of A, the generated signal has a sinusoidal waveform that is 90 degrees out of phase with the eccentricity on the media 104. Consequently, an eccentricity compensation signal may be generated having a sinusoidal waveform that is approximately 180 degrees out of phase with the eccentricity present in the media by combining Equations 1 and 2, thereby yielding the following equation:

$$Y(n)=A\cdot E(n)+B\cdot E(n-1)+C\cdot Y(n-1)-Y(n-2), n=0, 1, 2, \ldots \quad \text{Eqn. 3}$$

where Y(n) is the digital output from the controller 112, Y(n−1) is the previous value of Y(n), Y(n−2) is the previous value of Y(n−1), E(n) is the current error signal from optical pickup 102 after being converted to a digital signal by A/D converter 110, E(n−1) is the previous error signal from the optical pickup 102 after being converted to a digital signal by the A/D converter 110, A is constant less than zero (A<0), B is a constant greater than the absolute value of A (B>|A|), and C is equal to $2\cdot\cos(Hz\cdot 2\pi\cdot T_{samp})$, where Hz is the rotational frequency of the media 104 and $T_{samp}$ is the sample time of the servo system 100.

Figure 3:
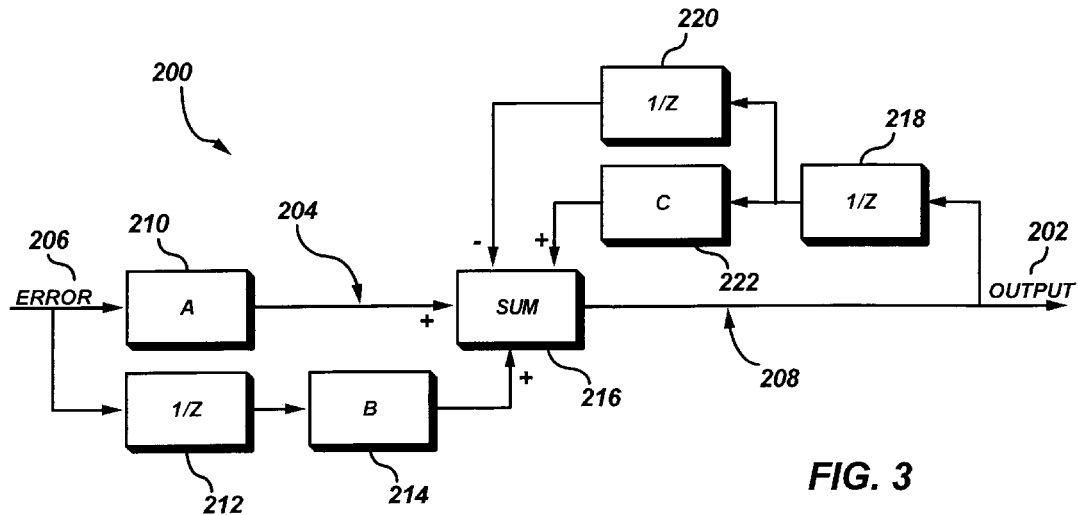
FIG. 3 is a block diagram illustrating a focus and tracking repeatable runout compensator in accordance with an exemplary embodiment of the present invention.

Referring now additionally to FIG. 3, a focus and tracking repeatable runout compensator in accordance with an exemplary embodiment of the present invention is described. The focus and tracking repeatable runout compensator 200 is utilized by controller 112 (FIG. 1) to implement Equation 3 for generating an eccentricity compensation signal (Y(n)) 202 having a sinusoidal waveform that is approximately 180 degrees (or an odd whole multiple of 180 degrees, e.g., 180 degrees, 540 degrees, 900 degrees, 1260 degrees, etc.) out of phase with the eccentricity on the media 104, thereby allowing optical pickup 102 (FIG. 1) to follow the eccentricity.

As shown in FIG. 3, the focus and tracking repeatable runout compensator 200 may be comprised of a cosine wave generator 204 implementing Equation 2 for generating a cosine wave output based on the sampled error values (E(n)) 206, and a sine wave generator 208 implementing Equation 1 for generating a sine wave output based on the previous values of the eccentricity compensation signal (Y(n)) 202. The cosine wave generator 204 and sine wave generator 208 are combined in the compensator 200 so that the sine wave output of the sine wave generator 208 is added to the cosine wave output generated by the cosine wave generator 204, yielding the eccentricity compensation signal (Y(n)) 202.

Cosine wave generator 204 includes a first multiplier 210 for multiplying the current error values (En) 206 by the constant A, a delay 212 for storing the previous error values (E(n−1)), and a second multiplier 214 for multiplying the previous error value (E(n−1)) from delay 212 by the constant B. The outputs of the first and second multipliers 210 & 214 are then summed by adder 216. By selecting values for A and B wherein A is less than 0 (A<0) and the absolute value of A is less than the value of B (|A|<B), a sine wave output is generated that is approximately 90 degrees out of phase with the error signal (i.e., a cosine wave) with an amplitude that is scaled by the A and B values.

Sine wave generator 208 includes a second delay 218 for saving the previous output value (Y(n−1)), a third delay 220 for storing the previous value of the second delay (Y(n−2)), and a third multiplier 222 for multiplying the previous output value (Y(n−1)) from the second delay 218 by the constant C. The outputs of the third delay 220 and the third multiplier 222 are then summed by adder 216 yielding a sine wave output that is summed to the cosine wave output of the cosine wave generator 204, thereby adding 90 degrees out of phase with the error signal (En) 206 and yielding a sine wave output signal (eccentricity compensation signal Y(n)) that is approximately 180 degrees out of phase with the error signal. Preferably, when the optical servo system 100 performs long jumps from the inner diameter of the media 104 to the outer diameter or vice versa, the contribution of the cosine wave generator (Equation 2) is not added until the optical pickup 102 has reached the desired location on the disc 124. In this manner, the system 100 may avoid incorrect focus and tracking adjustments caused by the large movement of the optical pickup 102, which may cause the error signal (E(n)) to not be representative of the eccentricity on the media 104.

As can be seen from Equation 3, the phase and amplitude of the output signal (Y(n)) from the repeatable runout compensator 200 is synchronized to the eccentricity on the media 104 due to the contribution of the cosine wave generator 204, which implements Equation 2. Consequently, if the error value (E(n)) approaches zero (e.g., the media 104 has little or no eccentricity) the contribution to the output signal (Y(n)) from cosine wave generator 204 is minimal and the output signal (Y(n)) is generated predominately by the sine wave generator 208, which implements Equation 1. It should be appreciated that if the values of constants A and B are selected so that the absolute value of constant A is equal to constant B (|A|=B), the compensator 200 becomes unstable and the optical pickup 102 may be unable to stay in focus or on track.

The magnitude of constants A and B is dependent on the resolution of the A/D and D/A converters 110 & 120 and the focus and tracking drivers 122, and on the characteristics of the focus and tracking motors 116 & 118. Further, the difference between the absolute value of constant A (|A|) and the value of constant B is determined by the type of response that is desired. Generally, a greater difference between the values of these constants will translate into a shorter time for the compensator 200 to settle out. However, in such cases the output signal (Y(n)) may not be as close to 180 degrees out of phase with the eccentricity on the media 104 as it would be if the difference between these values was less.

As shown in FIG. 3, the focus and tracking repeatable runout compensator 200 of the present invention implements Equation 3 utilizing three multiplies and four additions. In this manner, the amount of code space and execution time utilized by the optical servo system is greatly reduced compared to prior art systems which, for example, require calibration and re-calibration routines, extensive lookup tables, or the like. Further, as the amount of eccentricity in the media increases, the focus and tracking repeatable runout compensator 200 is capable of increasing the output automatically, since the output (Y(n)) is determined from the sampled the values of the error (E(n)).

Figure 4:
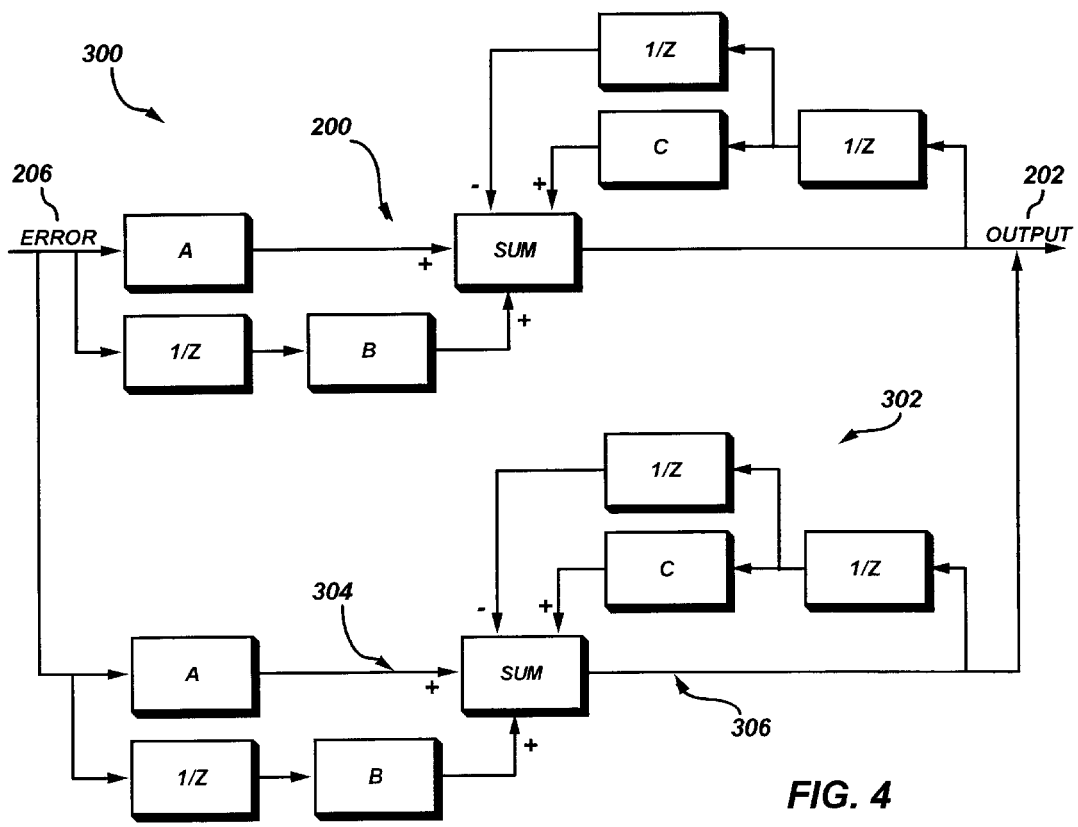
FIG. 4 is a block diagram illustrating a repeatable runout compensator system in accordance with an exemplary embodiment of the present invention, wherein a second repeatable runout compensator is placed in parallel with the focus and tracking repeatable runout compensator shown in FIG. 3 for providing correction for eccentric harmonic frequencies.

Referring now to FIG. 4, a repeatable runout compensator system in accordance with an exemplary embodiment of the present invention is described. The repeatable runout compensator system 300 includes multiple repeatable runout compensators utilized in parallel to compensate for eccentricity on the media. For instance, in FIG. 4, a repeatable runout compensator system 300 includes a second repeatable runout compensator 302 in parallel with focus and tracking repeatable runout compensator 200 for providing correction for eccentric harmonic frequencies. Like the focus and tracking repeatable runout compensator 200, the harmonic frequency repeatable runout compensator 302 is comprised of a cosine wave generator 304 implementing Equation 2 for generating a cosine wave output based on the sampled error values (E(n)) 206, and a sine wave generator 306 implementing Equation 1 for generating a sine wave output based on the previous values of the output (Y(n)) 202. The cosine wave generator 304 and sine wave generator 306 are combined in the compensator 302 so that the sine wave output of the sine wave generator 306 is added to the cosine wave output generated by the cosine wave generator 304, yielding an output signal (Y(n)) having a sinusoidal waveform that is approximately 180 degrees out of phase with the harmonic frequency of the eccentricity. In such an embodiment, the values of constants A, B and C in the compensator system 300 are selected to accommodate the harmonic frequency.

In exemplary embodiments, the repeatable runout compensators 200 & 302 of the present invention allow the optical pickup 102 of the optical servo system 100 to follow radial and axial eccentricity and/or harmonics of the eccentricity that are present on removable rotating optical disc media 104 in storage devices operating in either continuous angular velocity (CAV) or continuous linear velocity (CLV) operating modes. In storage devices employing a CAV operating mode, the rotational frequency (Hz) is fixed so that the value of C in Equation 3 is also constant, being determined using the equation:

$$C = 2 \cdot \cos(Hz \cdot 2\pi \cdot T_{samp})$$ Eqn. 4 where Hz is the rotational frequency of the media 104 and $T_{samp}$ is the sample time of the optical servo system 100. However, in storage devices employing a CLV operating mode, the rotational frequency (Hz) constantly changes as the optical pickup moves from the inner diameter of the media to its outer diameter. Thus, the value of C in Equation 3 also changes in proportion to the rotational frequency (Hz) as described in Equation 4. Consequently, in embodiments of the invention where controller 112 does not include a cosine function, a small lookup table may be utilized to vary the value of C with the rotational frequency (Hz). This lookup table may be implemented in code or stored in memory, such as, for example, memory 114.

In exemplary embodiments, the focus and tracking repeatable runout compensator of the present invention may be implemented as a series of steps via software or firmware executed by the controller of a servo system such as optical servo system 100 shown in FIG. 1. Based upon design preferences, it is understood that the specific order or hierarchy in which these steps are executed can be rearranged while remaining within the scope of the present invention. The attached method claims present elements of the various steps in a sample order, and are not meant to be limited to the specific order or hierarchy presented.

It is believed that the repeatable runout compensator of the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A repeatable runout compensator suitable for causing a transducer of a servo system in a storage device employing rotating media to follow eccentricity on the media, comprising:

a cosine wave generator capable of generating a cosine wave utilizing a sampled error value describing the eccentricity on the media; and a sine wave generator capable of generating a sine wave based on previous values of the repeatable runout compensator output;

wherein the cosine wave and the sine wave are added yielding an output suitable for controlling operation of the transducer to at least partially compensate for the eccentricity in the media.

2. The repeatable runout compensator of claim 1, wherein the output is approximately an odd whole multiple of 180 degrees out of phase with the eccentricity.

3. The repeatable runout compensator of claim 1, wherein the output is generated using the equation:

$$Y(n)=A\cdot E(n)+B\cdot E(n-1)+C\cdot Y(n-1)-Y(n-2), n=0, 1, 2, \ldots$$

where $Y(n)$ is the output, $Y(n-1)$ is a previous value of $Y(n)$, $Y(n-2)$ is a previous value of $Y(n-1)$, $E(n)$ is the current sampled error value, $E(n-1)$ is a previous value of $E(n)$, A is a constant less than zero (A<0), B is a constant greater than the absolute value of A (B>|A|), and C is equal to $2\cdot\cos(Hz\cdot 2\pi\cdot T_{samp})$ where Hz is the rotational frequency of the rotating media and $T_{samp}$ is the sample time of the servo system.

4. The repeatable runout compensator of claim 3, wherein at least two values of C obtained from the function $2\cdot\cos(Hz\cdot 2\pi\cdot T_{samp})$ are stored in a memory for allowing compensation for eccentricity in the media, where the media is rotating at different rotational frequencies (Hz) depending on the transducer location.

5. The repeatable runout compensator of claim 1, wherein the cosine wave generator generates the cosine wave by implementing the equation $$Y(n)=A\cdot E(n)+B\cdot E(n-1), n=0, 1, 2, \ldots$$

where $Y(n)$ is the cosine wave output, $E(n)$ is the current sampled error value, $E(n-1)$ is a previous value of $E(n)$, A is a constant less than zero (A<0), and B is a constant greater than the absolute value of A (B>|A|).

6. The repeatable runout compensator of claim 5, wherein the cosine wave generator comprises:

a first multiplier for multiplying the current sampled error value (E(n)) by the constant A;

a delay for saving the previous sampled error value (E(n-1)); and a second multiplier for multiplying the previous sampled error value (E(n-1) from the delay by the constant B;

wherein outputs of the first and second multipliers are summed for generating the cosine wave.

7. The repeatable runout compensator of claim 1, wherein the sine wave generator generates the sine wave by implementing the equation $$Y(n)=(2\cdot\cos(Hz\cdot 2\pi\cdot T_{samp}))\cdot Y(n-1)-Y(n-2), n=0, 1, 2, \ldots$$

where $Y(n)$ is the sine wave output, where Hz is the rotational frequency of the rotating media and $T_{samp}$ is the sample time of the servo system, $Y(n-1)$ is a previous value of $Y(n)$, and $Y(n-2)$ is a previous value of $Y(n-1)$.

8. The repeatable runout compensator of claim 7, wherein at least two values of C obtained from the function $2\cdot\cos(Hz\cdot 2\pi\cdot T_{samp})$ are stored in a memory for allowing compensation for eccentricity in the media, where the media is rotating at different rotational frequencies (Hz) depending on the transducer location.

9. The repeatable runout compensator of claim 7, wherein the sine wave generator comprises:

a first delay for saving the previous value of the output (Y(n-1));

a second delay for saving the previous value the output of the first delay (Y(n-2)); and a multiplier for multiplying the previous value of the output (Y(n-1) from the first delay by the constant C;

wherein outputs of the second delay and the multiplier are summed for generating the sine wave.

10. The repeatable runout compensator of claim 1, wherein the eccentricity on the media comprises at least one of radial eccentricity, axial eccentricity, and a harmonic frequency of the eccentricity.

11. The repeatable runout compensator of claim 1, wherein addition of the cosine wave from the cosine wave generator is suspended during jumps of the transducer to different locations relative to the media.

12. An optical servo system for a storage device employing rotating optical media, comprising:

an optical transducer capable of detecting eccentricity on the rotating optical media and producing a signal from which error values describing the eccentricity on the media can be obtained; and a controller coupled to the optical transducer, the controller being capable of:

(a) receiving a signal from the optical transducer measuring light reflection at a current location on the rotating media;

(b) obtaining a current error value from the received signal, the current error value describing the eccentricity at the current location;

(c) generating an eccentricity compensation signal for the current location utilizing the obtained current error value ("E(n)") and a previous error value ("E(n-1)") describing the eccentricity at a previous location on the rotating media, the eccentricity compensation signal being approximately an odd whole multiple of 180 degrees out of phase with the eccentricity at the current location on the media and being generated using the equation:

$$Y(n)=A\cdot E(n)+B\cdot E(n-1)+C\cdot Y(n-1)-Y(n-2), n=0, 1, 2, \ldots$$

where $Y(n)$ is the output, $Y(n-1)$ is a previous value of $Y(n)$, $Y(n-2)$ is a previous value of $Y(n-1)$, A is a constant less than zero (A<0), B is a constant greater than the absolute value of A (B>|A|), and C is equal to $2\cdot\cos(Hz\cdot 2\pi\cdot T_{samp})$ where Hz is the rotational frequency of the rotating optical media and $T_{samp}$ is a sample time of the optical servo system to obtain error values describing the eccentricity on the rotating media;

(d) transmitting the generated eccentricity compensation signal to control a position of the optical transducer relative to the media to at least partially compensate for the eccentricity at the current location in the media; and (e) iterating steps (a), (b), (c) and (d) for a plurality of locations on the media as the media is rotating.

13. The optical servo system of claim 12, wherein the controller comprises a repeatable runout compensator for generating the eccentricity compensation signal.

14. The optical servo system of claim 13, wherein the controller further comprises a second repeatable runout compensator in parallel with the first repeatable runout compensator, the second repeatable runout compensator for compensating for harmonics of the eccentricity on the media.

15. The optical servo system of claim 12, further comprising a memory, wherein at least two values of C obtained from the function $2 \cdot \cos(Hz \cdot 2\pi \cdot T_{samp})$ are stored in the memory for allowing the repeatable runout compensator to compensate for eccentricity in the media, where the media is rotating at different rotational frequencies (Hz) depending on the optical transducer location.

16. The optical servo system of claim 12, wherein the repeatable runout compensator comprises:

a first multiplier for multiplying the current error value (E(n)) by the constant A;

a first delay for saving the previous error value (E(n−1));

a second multiplier for multiplying the previous error value (E(n−1)) from the delay by the constant B;

a second delay for saving the previous value of the output (Y(n−1));

a third delay for saving the previous value the output of the first delay (Y(n−2)); and a third multiplier for multiplying the previous value of the output (Y(n−1)) from the first delay by the constant C;

wherein outputs of the first multiplier, the second multiplier, the third delay and the third multiplier are summed for generating the eccentricity compensation signal.

17. The optical servo system of claim 12, wherein the optical transducer comprises a light source suitable for producing coherent light that is reflected off of the rotating optical media and an optical detector assembly suitable for detecting the reflected light.

18. The optical servo system of claim 12, further comprising an A/D converter for converting the signal produced by the optical transducer from an analog signal to a digital signal suitable for processing by the controller.

19. The optical servo system of claim 12, further comprising at least one of a focus motor and a tracking motor suitable for adjusting the position of the optical transducer with respect to the rotating optical media.

20. The optical servo system of claim 19, further comprising a driver suitable for receiving the eccentricity compensation signal from the controller and controlling at least one of the focus motor and the tracking motor in response thereto.

21. The optical servo system of claim 20, further comprising a D/A converter for converting the eccentricity compensation signal generated by the controller from a digital signal to an analog signal suitable for use by the driver.

22. The optical servo system of claim 12, wherein the eccentricity on the media comprises at least one of radial eccentricity, axial eccentricity, and a harmonic frequency of the eccentricity.

23. The optical servo system of claim 12, wherein the controller is capable of iterating steps (a), (b), (c) and (d) sequentially as the media is rotating.

24. A method for causing an optical transducer of an optical servo system in a storage device employing rotating optical media to follow eccentricity on the media, comprising:

(a) receiving a signal produced by a measurement at a current location on the rotating media;

(b) obtaining a current error value from the received signal, the current error value describing the eccentricity at the current location on the media;

(c) generating an eccentricity compensation signal for the current location utilizing the obtained current error value ("E(n)") and a previous error value ("E(n−1)") describing the eccentricity at a previous location on the rotating media, the eccentricity compensation signal being approximately an odd whole multiple of 180 degrees out of phase with the eccentricity at the current location on the media and being generated using the equation:

$$Y(n) = A \cdot E(n) + B \cdot E(n-1) + C \cdot Y(n-1) - Y(n-2), \; n = 0, 1, 2, \ldots$$

where Y(n) is the output, Y(n−1) is a previous value of Y(n), Y(n−2) is a previous value of Y(n−1), A is a constant less than zero (A<0), B is a constant greater than the absolute value of A (B>|A|), and C is equal to $2 \cdot \cos(Hz \cdot 2\pi \cdot T_{samp})$ where Hz is the rotational frequency of the rotating optical media and $T_{samp}$ is a sample time of the optical servo system to obtain error values describing the eccentricity on the rotating media;

(d) transmitting the generated eccentricity compensation signal to control the position of the optical transducer relative to the media to at least partially compensate for the eccentricity at die current location in the media; and (e) iterating steps (a), (b), (c) and (d) for a plurality of locations on the media as the media is rotating.

25. The method of claim 24, wherein at least two values of C obtained from the function $2 \cdot \cos(Hz \cdot 2\pi \cdot T_{samp})$ are stored in a memory for allowing compensation for eccentricity in the media, where the media is rotating at different rotational frequencies (Hz) depending on the optical transducer location.

26. The method of claim 24, further comprising:

producing coherent light that is reflected off of the current location on the rotating media;

detecting the reflected light, and producing the signal from which the current error value is obtained.

27. The method of claim 24, wherein controlling the position of the optical transducer relative to the media comprises operating at least one of a focus motor and a tracking motor for adjusting the position of the optical transducer.

28. The method of claim 24, wherein the eccentricity on the media comprises at least one of radial eccentricity and axial eccentricity.

29. The method of claim 24, wherein the generated eccentricity signal is suitable for controlling the position of the optical transducer relative to the media for at least partially compensating for harmonics of the eccentricity on the media.

30. The method of claim 24, wherein iterating steps (a), (b), (c) and (d) includes iterating steps (a), (b), (c) and (d) sequentially as the media is rotating.

* * * * *

UNITED STATES PATENT AND TRADEMARK OFFICE
CERTIFICATE OF CORRECTION

PATENT NO. : 6,765,848 B2
DATED : July 20, 2004
INVENTOR(S) : Michael Faucett

It is certified that error appears in the above-identified patent and that said Letters Patent is hereby corrected as shown below:

Column 10,
Line 31, replace "the eccentricity at die current location" with -- the eccentricity at the current location --

Signed and Sealed this

Twelfth Day of April, 2005

JON W. DUDAS
*Director of the United States Patent and Trademark Office*